US011935463B2

(12) United States Patent
In et al.

(10) Patent No.: US 11,935,463 B2

(45) Date of Patent: Mar. 19, 2024

(54) LIGHT EMITTING PANEL

(71) Applicant: Samsung Display Co., Ltd., Yongin-si (KR)

(72) Inventors: Hai-Jung In, Seoul (KR); Minku Lee, Asan-si (KR); Seunghee Lee, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/087,280

(22) Filed: Dec. 22, 2022

(65) Prior Publication Data

US 2023/0267876 A1 Aug. 24, 2023

(30) Foreign Application Priority Data

Feb. 21, 2022 (KR) ........................ 10-2022-0022238

(51) Int. Cl.

*G06F 1/16* (2006.01)
*G06F 3/02* (2006.01)
*G06F 3/0354* (2013.01)
*G09G 3/32* (2016.01)

(52) U.S. Cl.

CPC ....... *G09G 3/32* (2013.01); *G09G 2300/0852* (2013.01); *G09G 2330/08* (2013.01); *G09G 2330/10* (2013.01)

(58) Field of Classification Search

CPC ............. G09G 3/32; G09G 2300/0852; G09G 2330/08; G09G 2330/10; G09G 2300/0426; G09G 3/006

See application file for complete search history.

(56) References Cited

U.S. PATENT DOCUMENTS

| | | | | |
|---|---|---|---|---|
| 2005/0134526 A1 | 6/2005 | Willem et al. | | |
| 2005/0275352 A1 | 12/2005 | Sun | | |
| 2007/0152567 A1 | 7/2007 | Yao et al. | | |
| 2011/0032442 A1 | 2/2011 | van Aerle et al. | | |
| 2015/0108482 A1* | 4/2015 | Kim | H10K 59/131 438/4 | |
| 2021/0201818 A1* | 7/2021 | Jang | G09G 3/2088 | |
| 2021/0328002 A1* | 10/2021 | Lee | H10K 59/1315 | |

FOREIGN PATENT DOCUMENTS

| | | |
|---|---|---|
| KR | 10-1581368 B1 | 12/2015 |
| KR | 10-1993334 B1 | 6/2019 |
| KR | 10-2203103 B1 | 1/2021 |

* cited by examiner

*Primary Examiner* — Andrew Sasinowski

(74) *Attorney, Agent, or Firm* — Lewis Roca Rothgerber Christie LLP

(57) ABSTRACT

A light emitting display device includes: a light emitting diode at a display area, and including an anode and a cathode; a pixel circuit at the display area, and to transmit an output current to the anode of the light emitting diode; a repair line extending in a first direction; a repair pixel circuit connected to the repair line; a bridge including one end overlapping with the repair line; and a connecting portion connected to the anode, and including one end overlapping with the bridge. The bridge is not connected to the repair line, the connecting portion, and the anode.

20 Claims, 11 Drawing Sheets

LIGHT EMITTING PANEL

CROSS-REFERENCE TO RELATED APPLICATION

This application claims priority to and the benefit of Korean Patent Application No. 10-2022-0022238, filed in the Korean Intellectual Property Office on Feb. 21, 2022, the entire content of which is incorporated by reference herein.

BACKGROUND

1. Field

Aspects of embodiments of the present disclosure relate to a light emitting panel, and more particularly, to a light emitting panel that may be repaired.

2. Description of the Related Art

A light emitting panel includes two electrodes (e.g., an anode and a cathode), and a light emitting layer positioned between the two electrodes. Electrons injected from one electrode (e.g., the cathode) and holes injected from another electrode (e.g., the anode) are combined with one another in the light emitting layer to generate excitons, and the generated excitons release energy to emit light.

The light emitting panel includes a plurality of pixels including a light emitting diode configured of a cathode, an anode, and a light emitting layer. Each pixel includes a pixel circuit including a plurality of transistors and capacitors for driving the light emitting diode.

The above information disclosed in this Background section is for enhancement of understanding of the background of the present disclosure, and therefore, it may contain information that does not constitute prior art.

SUMMARY

Pixel defects may occur due to characteristic deviations of a transistor and a capacitor provided in each pixel, or disconnection or short circuit of wires. In this case, instead of discarding the light emitting panel, defective pixels may be repaired and used.

One or more embodiments of the present disclosure are directed to a light emitting panel in which display quality of surrounding pixels may not deteriorate due to repair.

According to one or more embodiments of the present disclosure, a light emitting display device includes: a light emitting diode at a display area, and including an anode and a cathode; a pixel circuit at the display area, and configured to transmit an output current to the anode of the light emitting diode; a repair line extending in a first direction; a repair pixel circuit connected to the repair line; a bridge including one end overlapping with the repair line; and a connecting portion connected to the anode, and including one end overlapping with the bridge. The bridge is not connected to the repair line, the connecting portion, and the anode.

In an embodiment, the bridge may have a first parasitic capacitance with the repair line, and a second parasitic capacitance with the connecting portion.

In an embodiment, a first short position may be located at a portion in which the one end of the bridge and the repair line overlap with each other; a second short position may be located at a portion in which the one end of the connecting portion and the bridge overlap with each other; and a first cut position may be located at a portion in which the output current of the pixel circuit is transmitted to the anode.

In an embodiment, the first cut position may not be located at the bridge and the connecting portion.

In an embodiment, the bridge may be electrically floating.

In an embodiment, a first voltage may be configured to be transmitted to the bridge, the first voltage being one of a plurality of voltages that are applied to the pixel circuit, and may have a constant voltage value.

In an embodiment, the first voltage may be one of a driving voltage applied to the pixel circuit, a driving low voltage transmitted to the cathode, or an initializing voltage that initializes the pixel circuit.

In an embodiment, a second cut position may be located at a portion configured to transmit the first voltage to the bridge, and when the second cut position is cut, the first voltage may not be transmitted to the bridge.

In an embodiment, the pixel circuit may include a driving transistor configured to generate the output current; and the driving transistor may be an n-type transistor.

In an embodiment, the pixel circuit may further include: a second transistor connected to a data line configured to transmit a data voltage; and a storage capacitor connected to a gate electrode of the driving transistor.

In an embodiment, the repair pixel circuit may include a driving transistor that is an n-type transistor, a second transistor configured to receive a data voltage, and a storage capacitor connected to the gate electrode of the driving transistor of the repair pixel circuit.

In an embodiment, the repair pixel circuit may be located at a non-display area around the display area.

According to one or more embodiments of the present disclosure, a light emitting display device includes: a pixel circuit configured to generate an output current, and including an output terminal configured to output the output current; an anode configured to receive the output current from the output terminal of the pixel circuit; a repair line extending in a first direction; a connecting portion connected to the anode; and a bridge having one end overlapping with the repair line in a plan view, and another end overlapping with the connecting portion in a plan view. The bridge is located at a first conductive layer, and the repair line and the connecting portion are located at a different conductive layer from the first conductive layer.

In an embodiment, the connecting portion and the repair line may be located at the same conductive layer as each other; and the bridge may be located at the first conductive layer above the conductive layer of the connecting portion and the repair line.

In an embodiment, the connecting portion may be located at a second conductive layer different from the first conductive layer; the repair line may be located at a third conductive layer different from the first conductive layer and the second conductive layer; and the bridge may be located at the first conductive layer above the second conductive layer and the third conductive layer of the connecting portion and the repair line.

In an embodiment, the light emitting display device may further include a first anode connecting member connecting the anode and the connecting portion to each other, and one end of the first anode connecting member may be connected to the connecting portion through an opening, and another end of the first anode connecting member may be connected to the anode through an opening.

In an embodiment, the light emitting display device may further include a second anode connecting member connecting the output terminal of the pixel circuit and the anode to each other, and one end of the second anode connecting member may be connected to the output terminal through an opening, and another end of the second anode connecting member may be connected to the anode through an opening.

In an embodiment, a first short position may be located at a portion in which the one end of the bridge and the repair line overlap with each other; a second short position may be located at a portion in which the other end of the bridge and the connecting portion overlap with each other; and a first cut position may be located at the output terminal of the pixel circuit.

In an embodiment, the bridge may be electrically floating.

In an embodiment, the pixel circuit may include: a driving transistor configured to generate the output current; a second transistor connected to a data line configured to transmit a data voltage; and a storage capacitor connected to a gate electrode of the driving transistor. The driving transistor may be an n-type transistor.

According to one or more embodiments of the present disclosure, by reducing interference between a repair line and an anode of a pixel adjacent thereto, influence on the anode of the adjacent pixel due to a voltage applied to the repair line may be reduced, and thus, display quality of the adjacent pixel may be prevented or substantially prevented from deteriorating.

BRIEF DESCRIPTION OF THE DRAWINGS

The above and other aspects and features of the present disclosure will be more clearly understood from the following detailed description of the illustrative, non-limiting embodiments with reference to the accompanying drawings.

DETAILED DESCRIPTION

Figure 1:
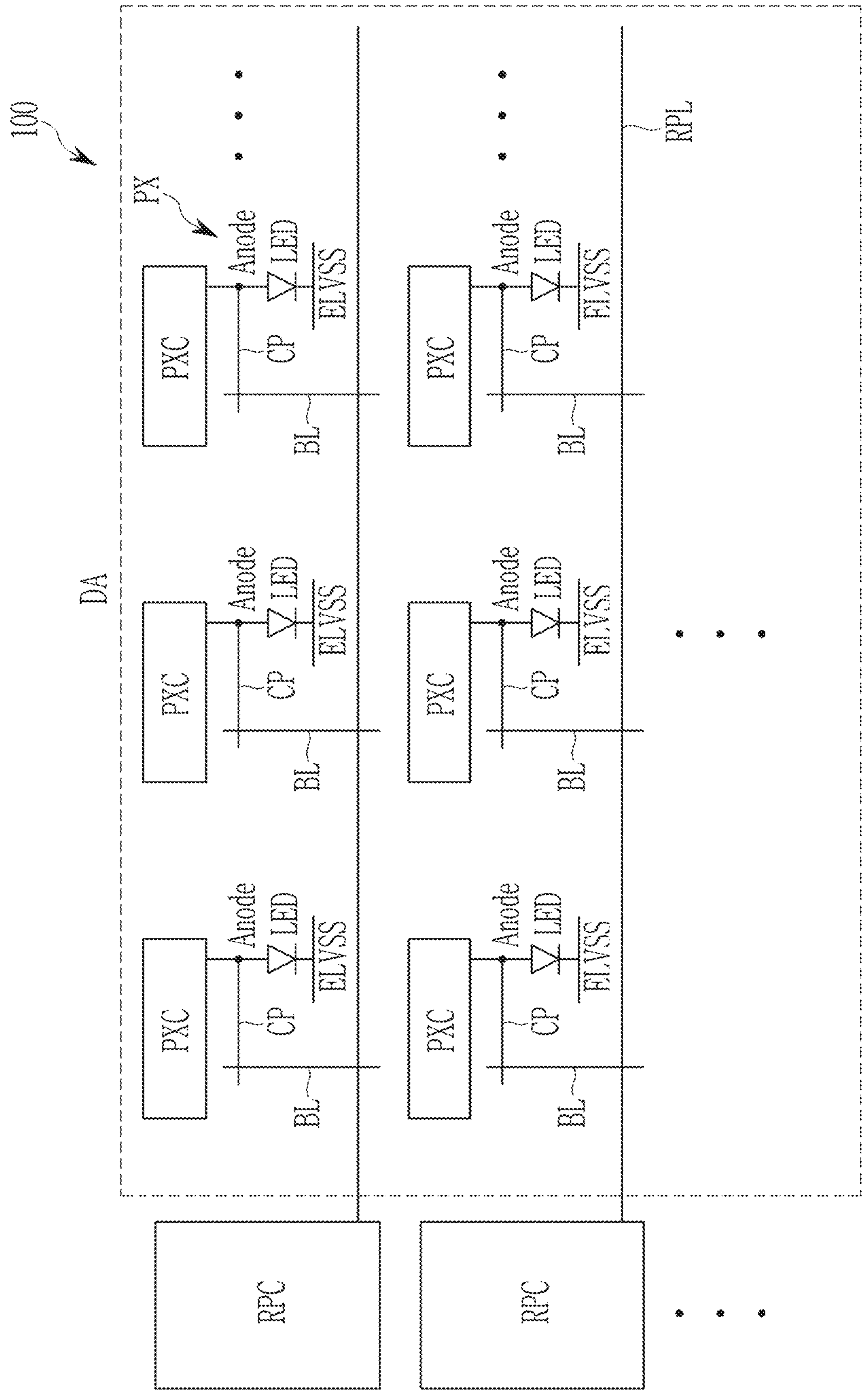
FIG. 1 illustrates a schematic circuit diagram of a light emitting panel according to an embodiment.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

In the drawings, the relative sizes of elements, layers, and regions may be exaggerated and/or simplified for clarity. Spatially relative terms, such as “beneath,” “below,” “lower,” “under,” “above,” “upper,” and the like, may be used herein for ease of explanation to describe one element or feature’s relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as “below” or “beneath” or “under” other elements or features would then be oriented “above” the other elements or features. Thus, the example terms “below” and “under” can encompass both an orientation of above and below. The device may be otherwise oriented (e.g., rotated 90 degrees or at other orientations) and the spatially relative descriptors used herein should be interpreted accordingly.

Further, as used herein, the phrase “in a plan view” or “on a plane” refers to a view of a target portion from the top, and the phrase “in a cross-sectional view” or “on a cross-section” refers to a view of a cross-section from the side by vertically cutting a target portion.

It will be understood that, although the terms “first,” “second,” “third,” etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being “on,” “connected to,” or “coupled to” another element or layer, it can be directly on, connected to, or coupled to the other element or layer, or one or more intervening elements or layers may be present. Similarly, when a layer, an area, or an element is referred to as being “electrically connected” to another layer, area, or element, it may be directly electrically connected to the other layer, area, or element, and/or may be indirectly electrically connected with one or more intervening layers, areas, or elements therebetween. In addition, it will also be understood that when an element or layer is referred to as being “between” two elements or layers, it can be the only element or layer between the two elements or layers, or one or more intervening elements or layers may also be present.

In addition, as used herein, when an element, such as a wire, layer, film, region, area, substrate, plate, or constituent element, is described as “extending,” “extends,” “extended,” and the like in a first direction or second direction, the element may not only extend in the corresponding direction in a straight shape or a straight line, but may substantially extend in the corresponding direction, such that the element may be partially bent, may have a zigzag structure, a curved structure, or the like.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c," "at least one of a, b, and c," and "at least one selected from the group consisting of a, b, and c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

In addition, as used herein, both an electronic device (e.g., a mobile phone, a TV, a monitor, a laptop computer, and the like) including a display device or a display panel, and an electronic device including a display device or a display panel, may be manufactured by a manufacturing method described herein, and are not excluded from the spirit and scope of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 illustrates a schematic circuit diagram of a light emitting panel according to an embodiment.

As shown in FIG. 1, a light emitting panel 100 according to an embodiment is divided into a display area DA for displaying an image, and a non-display area surrounding (e.g., around a periphery of) the display area DA. A plurality of pixels PX, and a plurality of repair lines RPL for repairing the pixels PX are formed at (e.g., in or on) the display area DA. A repair pixel circuit RPC is formed at (e.g., in or on) the non-display area. In the embodiment of FIG. 1, the pixel PX basically includes a pixel circuit PXC, and a light emitting diode LED. The pixel PX may additionally include a bridge BL, and a connecting portion CP that may be connected to the bridge, so as to repair a defective pixel. The light emitting diode LED includes two electrodes, or in other words, an anode and a cathode, and a driving low voltage ELVSS may be transmitted to the cathode, while an output voltage output from a driving transistor included in the pixel circuit PXC may be transmitted to the anode.

A plurality of scan lines extending in a first direction (e.g., a horizontal direction), and a plurality of data lines extending in a second direction (e.g., vertical direction) crossing (e.g., perpendicular to or substantially perpendicular to) the first direction may be additionally included at (e.g., in or on) the display area DA. Further, various voltage lines (e.g., a driving voltage line for transmitting a driving voltage, a driving low voltage line for transmitting the driving low voltage ELVSS, an initializing voltage line for transmitting an initializing voltage, and the like) may be additionally included at (e.g., in or on) the display area DA.

The non-display area may include various drivers, such as a scan driver that generates a scan signal, and a data driver that generates and outputs a data voltage.

The scan driver is connected to the scan line to transmit a scan signal to the pixel circuit PXC included in the pixel PX, and the data driver is connected to the data line to transmit a data voltage to the pixel circuit PXC. Here, one pixel circuit PXC may be connected to at least one scan line, one data line, and at least one voltage line.

The repair line RPL is mostly positioned at (e.g., in or on) the display area DA. The repair line RPL extends in the first direction, and extends to the non-display area to be connected to the repair pixel circuit RPC.

The repair pixel circuit RPC is formed at (e.g., in or on) the non-display area, and is connected to the repair line RPL. While FIG. 1 shows, for convenience of illustration, that the repair pixel circuit RPC is positioned only at the left side of the display area DA, the present disclosure is not limited thereto, and in some embodiments, the repair pixel circuit RPC may be positioned only at the right side of the display area DA, or may be positioned at both the left and right sides of the display area DA. The repair pixel circuit RPC may have the same or substantially the same structure as that of the pixel circuit PXC. The repair pixel circuit RPC may be connected to an additional data line positioned at (e.g., in or on) the non-display area to receive a data voltage, and may be further connected to at least one scan line and at least one voltage line. As a result, the repair pixel circuit RPC may receive the same or substantially the same signal as that of the pixel circuit PXC, and thus, a driving transistor included in the pixel circuit PXC may generate and output the same or substantially the same output current.

The output current generated by the repair pixel circuit RPC may be transmitted to the light emitting diode LED through the repair line RPL, so that the defective pixel may be repaired to emit a normal luminance.

In order for the output current generated by the repair pixel circuit RPC to be transmitted to the light emitting diode LED of the defective pixel PX, in the present embodiment, in addition to the repair line RPL, the bridge BL and the connecting portion CP that are electrically separated from each other are further included. In this structure, a repair process in which at least two portions are shorted and at least one portion is cut may be performed. This will be described in more detail below with reference to FIG. 4.

The pixel circuit PXC and the repair pixel circuit RPC may have various suitable circuit structures according to various embodiments. In the present embodiment, the pixel circuit PXC and the repair pixel circuit RPC may include an n-type transistor as a driving transistor. Here, the n-type transistor may have a characteristic in which it is turned on when a voltage of a gate electrode thereof is relatively high. While the driving transistors of the pixel circuit PXC and the repair pixel circuit RPC may be p-type transistors, a degree of improvement in display quality according to one or more embodiments of the present disclosure may be relatively larger when the driving transistor is an n-type transistor.

Hereinafter, a basic circuit structure of the pixel circuit PXC and/or of the repair pixel circuit RPC will be described in more detail with reference to FIG. 2.

Figure 2:
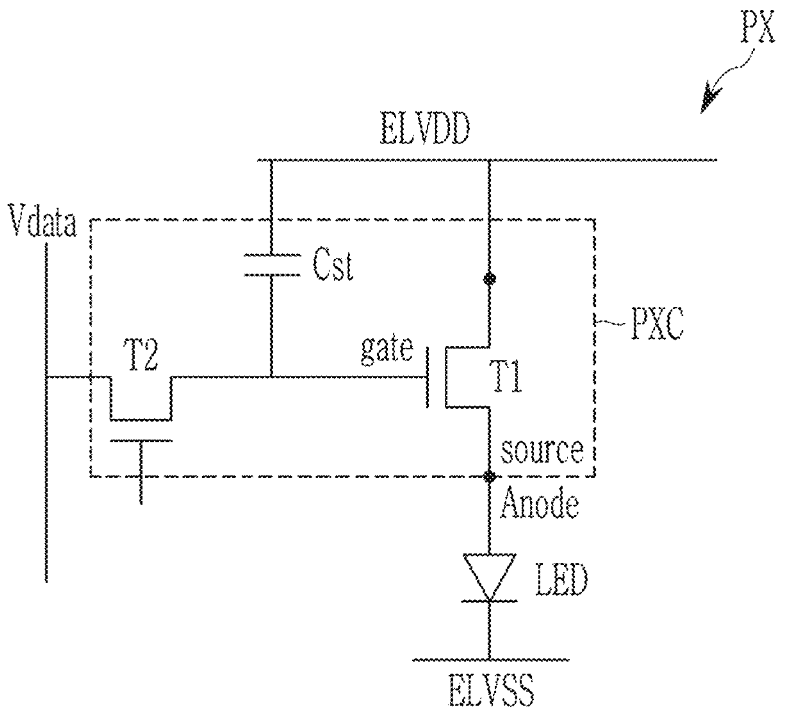
FIG. 2 illustrates an equivalent circuit diagram of a pixel of a light emitting panel according to an embodiment.

FIG. 2 illustrates an equivalent circuit diagram of a pixel of a light emitting panel according to an embodiment.

The pixel PX according to the embodiment of FIG. 2 includes the pixel circuit PXC including one driving transistor T1, one switching transistor T2, and one capacitor Cst, and the light emitting diode LED.

A gate electrode (gate) of the driving transistor T1 is connected to one end of the storage capacitor Cst. A source electrode (source) of the driving transistor T1 is connected to an anode (Anode) of the light emitting diode LED. The remaining electrode (e.g., a drain electrode) of the driving transistor T1 is connected to a driving voltage line that transmits a driving voltage ELVDD.

A gate electrode of the second transistor T2 is connected to a scan line. One electrode of the second transistor T2 is connected to a data line to which a data voltage (Vdata) is applied, and the other electrode of the second transistor T2 is connected to one electrode of the driving transistor T1. In FIG. 2, the data voltage (Vdata) input through the second transistor T2 is directly transmitted to the gate electrode (gate) of the driving transistor T1. However, in some embodiments, the data voltage (Vdata) may be transmitted to one electrode of the driving transistor T1 through various suitable routes, and then may be finally transmitted to the gate electrode of the driving transistor T1 and may be stored in one end of the storage capacitor Cst.

In the storage capacitor Cst according to the embodiment of FIG. 2, one electrode thereof may be connected to the gate electrode (gate) of the driving transistor T1, and the other electrode thereof may receive the driving voltage ELVDD.

The pixel circuit PXC of the pixel PX according to the embodiment of FIG. 2 allows the second transistor T2 to be turned on according to the scan signal received through the scan line, such that the data voltage (Vdata) transmitted from the data line may be transmitted to the gate electrode (gate) of the driving transistor T1 to be stored at one end of the storage capacitor Cst. Afterwards, when the driving voltage ELVDD is transferred to the drain electrode of the driving transistor T1 in a light emitting period, a degree of turning on the driving transistor T1 is adjusted according to the voltage of the gate electrode (gate) of the driving transistor T1, so that an amount of an output current is changed. The output current of the driving transistor T1 is transmitted to the anode of the light emitting diode LED, and luminance emitted by the light emitting diode LED is also changed according to the amount of the transmitted output current.

Here, the driving transistor T1 may be an n-type transistor, and the second transistor T2 may also be an n-type transistor. Accordingly, the driving transistor T1 and the second transistor T2 may be turned on when the voltages of the gate electrodes thereof have a relatively large voltage value.

In some embodiments, the second transistor T2 may be a p-type transistor, and in this case, the second transistor T2 may be turned on when the voltage of the gate electrode thereof has a relatively low voltage value.

A circuit structure of the repair pixel circuit RPC according to the present embodiment may be the same or substantially the same as the circuit structure of the pixel circuit PXC of FIG. 2.

In some embodiments, the pixel circuit PXC may include two or more switching transistors, and in this case, two or more capacitors may be included. Even in this case, the circuit structure of the repair pixel circuit RPC may be the same or substantially the same as that of the pixel circuit PXC.

Figure 5:
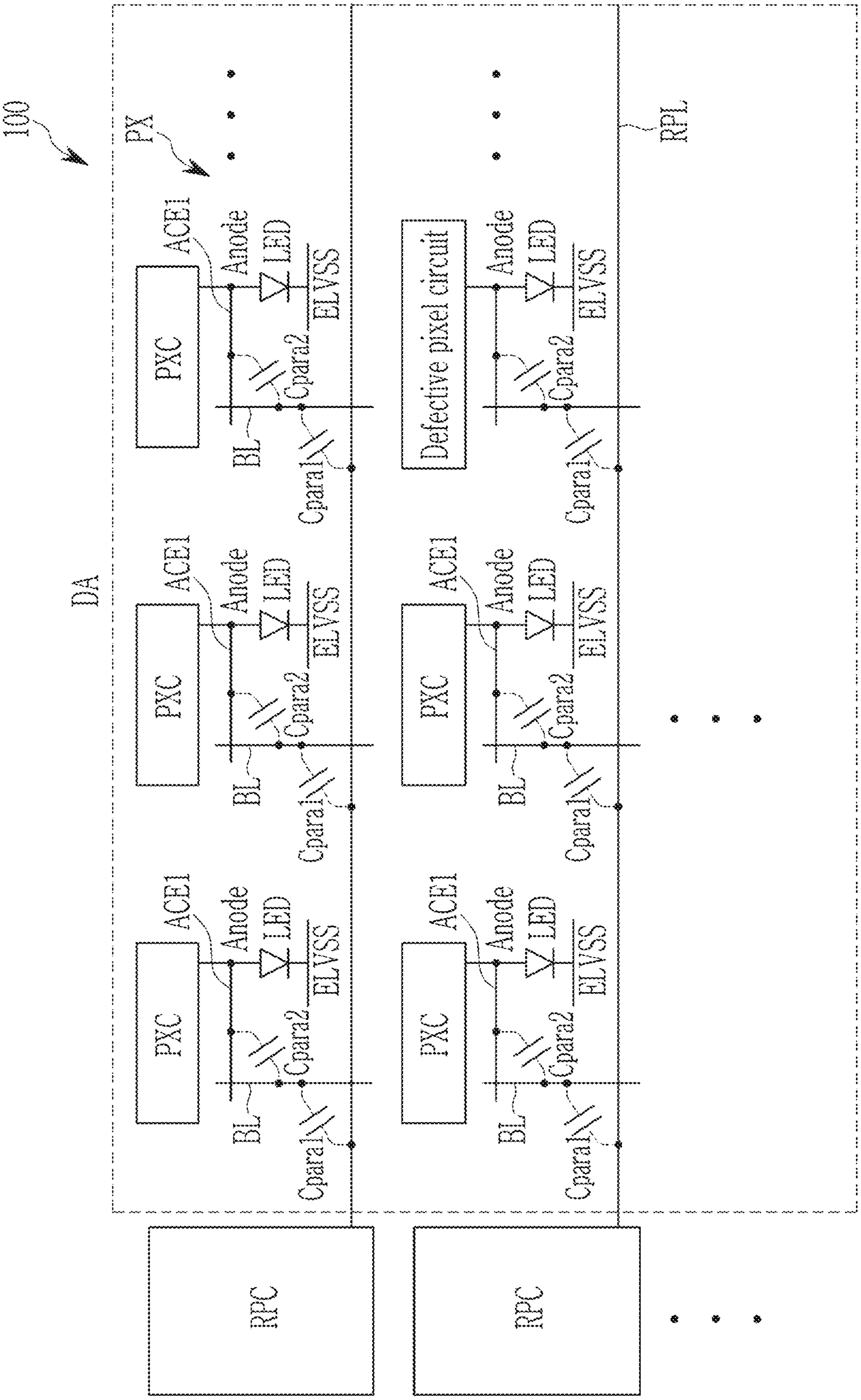
FIG. 5 additionally illustrates parasitic capacitance of the light emitting panel according to the embodiment of FIG. 1.

The driving transistors T1 included in the pixel circuit PXC and the repair pixel circuit RPC may include an n-type transistor, because a degree of improving display quality degradation caused by a parasitic capacitance as shown in FIG. 5 may be larger than that of when the p-type transistor is used. However, in some embodiments, the driving transistors of the pixel circuit PXC and the repair pixel circuit RPC may be p-type transistors.

In some embodiments, the pixel PX may be a kind of switching transistor, and may further include a compensating transistor capable of compensating for the driving transistor T1. In this case, the compensating transistor may have a structure that connects the gate electrode (gate) of the driving transistor T1 and one of the other two electrodes of the driving transistor T1 to each other.

In addition, in some embodiments, the pixel PX may include various initializing transistors, or may further include an additional transistor between the driving transistor T1 and the driving voltage line, and/or between the driving transistor T1 and the light emitting diode LED.

Hereinafter, a planar structure of the display area DA of the light emitting panel according to an embodiment will be described in more detail with reference to FIG. 3.

Figure 3:
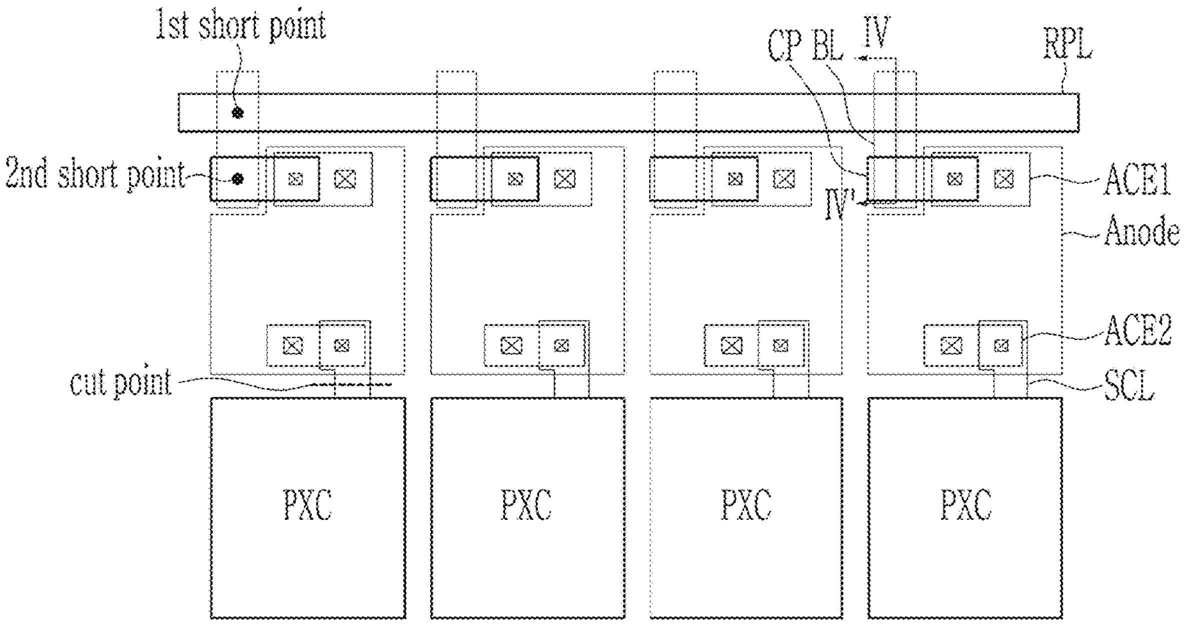
FIG. 3 illustrates a top plan view of a portion of a light emitting panel according to an embodiment.

FIG. 3 illustrates a top plan view of a portion of a light emitting panel according to an embodiment.

In the top plan view illustrated in FIG. 3, the pixel circuit PXC is illustrated as not overlapping with the anode (Anode) of the light emitting diode LED in a plan view, but the pixel circuit PXC and the anode (Anode) may at least partially overlap with each other in a plan view according to various embodiments.

The output current of the pixel circuit PXC is output through an output terminal SCL. An end of the output terminal SCL has an extension part, and may be electrically connected to an anode connecting member ACE2 (hereinafter, also referred to as a second anode connecting member) through an opening. The anode connecting member ACE2 is a portion that connects the anode (Anode) and the pixel circuit PXC to each other, and one end thereof may be connected to the anode (Anode) through an opening, while the other end thereof may be connected to the output terminal SCL of the pixel circuit PXC through another opening. In some embodiments, the anode connecting member ACE2 may be omitted (e.g., may not be included), and the anode (Anode) may be directly connected to the output terminal SCL of the pixel circuit PXC. In a cross-sectional view, the anode connecting member ACE2 may be positioned between the anode (Anode) and the output terminal SCL of the pixel circuit PXC, and the anode (Anode) may be farthest from the substrate and be positioned at an uppermost position.

The anode (Anode) may be connected to an anode connecting member ACE1 (hereinafter, also referred to as a first anode connecting member) through another opening. The anode connecting member ACE1 may be used to connect the anode (Anode) to the connecting portion CP formed for repair, and one end of the anode connecting member ACE1 is connected to the connecting portion CP through an opening, while the other end thereof is connected to the anode (Anode) through another opening. In some embodiments, the anode (Anode) may be directly connected to the connecting portion CP. Here, the anode (Anode) is connected to the connecting portion CP and the pixel circuit PXC before the repair process is performed.

The connecting portion CP has a portion overlapping with the bridge BL in a plan view, and may have a structure extending in the first direction. In other words, one end of the connecting portion CP overlaps with the anode connecting member ACE1 and is connected thereto through an opening, and the other end thereof overlaps with the bridge BL. The portion in which the connecting portion CP and the bridge BL overlap with each other may be a position (e.g., a 2nd short point) for shorting with a laser beam or the like in the repair process.

The bridge BL may have a structure extending in a direction (e.g., the second direction) crossing (e.g., perpendicular to or substantially perpendicular to) a direction (e.g., the first direction) in which the connecting portion CP extends. One end of the bridge BL overlaps with the connecting portion CP in a plan view, and the other end thereof overlaps with the repair line RPL in a plan view. The bridge BL is in a floating state before the repair process is performed, and may be electrically connected to another portion by the repair process. At opposite ends of the bridge BL, positions (e.g., a 1st short point and the 2nd short point) for shorting with a laser or the like in the repair process are positioned, respectively, and the bridge BL is connected to the repair line RPL through the first short point (1st short point), and is connected to the anode (Anode) through the connecting portion CP through the second short point (2nd short point). As a result, the output current of the repair pixel circuit RPC transmitted through the bridge BL is transmitted to the anode (Anode) of a defective pixel through the repair process. In this case, in the repair process, the anode (Anode) and the pixel circuit PXC are cut to be electrically separated from each other, and FIG. 3 illustrates that a cut position (e.g., a cut point) is at a portion of the output terminal SCL. However, in some embodiments, the cut position (cut point) may be at another position.

Here, the bridge BL and the connecting portion CP may be positioned at (e.g., in or on) different conductive layers from each other. In addition, the connecting portion CP may be positioned at (e.g., in or on) a conductive layer different from those of the anode (Anode) and the anode connecting member ACE1. In addition, the anode (Anode), the anode connecting member ACE2, and the output terminal SCL may also be positioned at (e.g., in or on) different conductive layers from one another.

Figure 4:
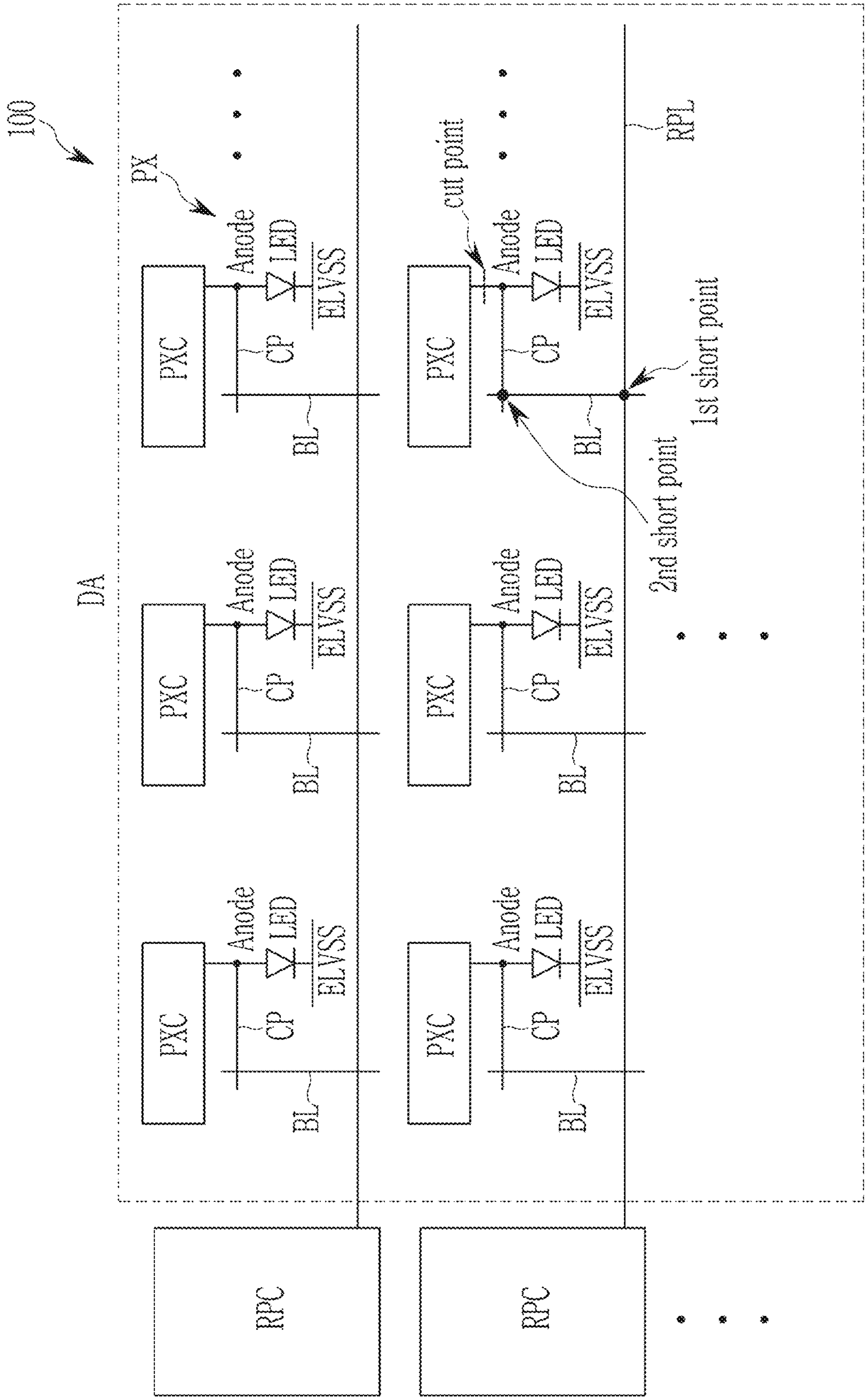
FIG. 4 illustrates a repair position of the light emitting panel according to the embodiment of FIG. 1.

The two short positions and one cut position shown in FIG. 3 may be the same or substantially the same as those shown in a circuit diagram of FIG. 4.

FIG. 4 illustrates a repair position of the light emitting panel according to the embodiment of FIG. 1.

In FIG. 4, a pixel positioned at a lower right side of the six pixels shown is referred to as a defective pixel, and a repair position thereof is illustrated.

Referring to FIG. 4, at opposite ends of the bridge BL, the positions (e.g., the 1st short point and the 2nd short point) for shorting with a laser or the like are positioned, respectively. The bridge BL is connected to the repair line RPL through the first short point (1st short point), and is connected to the anode (Anode) through the connecting portion CP through the second short point (2nd short point). The cut position (cut point) for electrically separating the anode (Anode) and the pixel circuit PXC from each other during repair is also shown.

Characteristics of the light emitting panel 100 having the repair line RPL as described above will be described in more detail below with reference to FIG. 5.

FIG. 5 additionally illustrates parasitic capacitance of the light emitting panel according to the embodiment of FIG. 1.

In the light emitting panel 100, the repair line RPL is basically disposed so that the anode (Anode) is positioned adjacent thereto, and a parasitic capacitance is inevitably formed. However, according to the embodiment of FIG. 1 and FIG. 3, opposite ends of the bridge BL are formed in a floating state with the repair line RPL and the anode (Anode), so that the repair line RPL is connected to the anode (Anode) through two parasitic capacitances (Cpara1 and Cpara2). Accordingly, compared with a comparative example (e.g., see FIG. 8) in which the repair line RPL and the anode (Anode) are connected by one parasitic capacitance, an effect on the anode (Anode) is small.

In more detail, referring to FIG. 2, because the driving transistor T1 included in the pixel circuit PXC is an n-type transistor, the source electrode (source) of the driving transistor T1 is connected to the anode (Anode) of the light emitting diode LED. The driving transistor T1 generates an output current based on a voltage difference between the gate electrode thereof and the source electrode thereof, and when the voltage of the anode (Anode) is changed because the source electrode of the n-type transistor is connected to the anode (Anode), a degree to which the driving transistor T1 is turned on is changed, so that the output current may be differently output.

Figure 9:
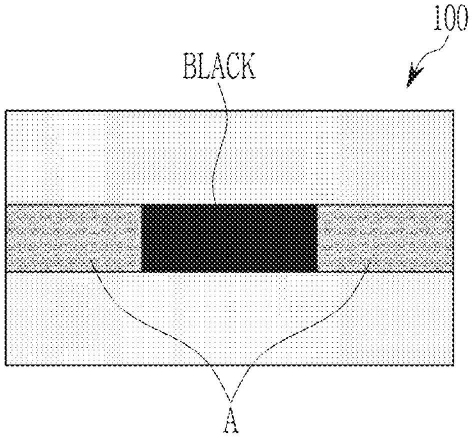
FIG. 9 illustrates a display defect of a light emitting panel according to a comparative example.

However, in the present embodiment, because the repair line RPL and the anode (Anode) are connected by two parasitic capacitances (Cpara1 and Cpara2), and are coupled with a very small parasitic capacitance value, even though the driving transistor T1 is formed as an n-type transistor, the voltage changes of the anode and of the source electrode of the driving transistor T1 are small due to the voltage change of the repair line RPL. Accordingly, the output current of the driving transistor T1 may not be changed, and deterioration of display quality may not occur as shown in FIG. 9.

Figure 6:
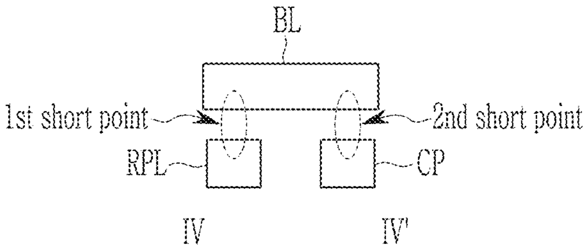
FIGS. 6-7 illustrate cross-sectional structures taken along the line IV-IV' shown in FIG. 3 according to one or more embodiments.
Figure 7:
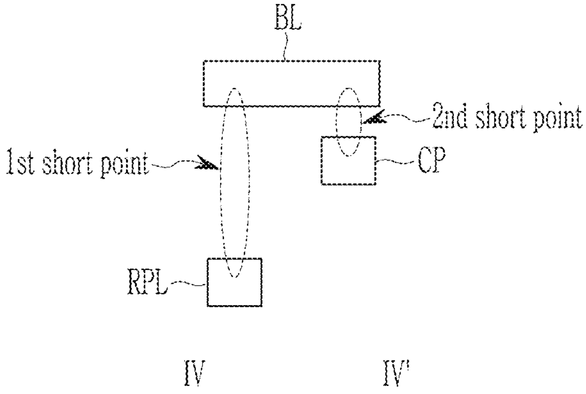

Because the parasitic capacitances of the repair line RPL and of the anode (Anode) are also affected by the two parasitic capacitances (Cpara1 and Cpara2), respectively, the parasitic capacitances are compared and described through cross-sectional structures of different examples with reference to FIG. 6 and FIG. 7.

FIG. 6 and FIG. 7 illustrate cross-sectional structures according to one or more embodiments, and may correspond to a cross-section taken along the line IV-IV' shown in FIG. 3.

In the embodiment of FIG. 6, an example is illustrated in which the bridge BL is positioned at (e.g., in or on) an uppermost conductive layer, and the connecting portion CP and the repair line RPL are positioned at (e.g., in or on) the same conductive layer as each other.

On the other hand, in the embodiment of FIG. 7, an example is illustrated in which the connecting portion CP and the repair line RPL are positioned at (e.g., in or on) different conductive layers from each other, and the repair line RPL is positioned at (e.g., in or on) a conductive layer closer to the substrate than that of the connecting portion CP. In FIG. 6 and FIG. 7, the connecting portion CP is connected to the anode (Anode).

Compared with the embodiment of FIG. 6, in the embodiment of FIG. 7, the repair line RPL, the connecting portion CP, and the anode (Anode) are coupled with a smaller parasitic capacitance. Accordingly, the embodiment of FIG. 7 has a smaller parasitic capacitance than that of the embodiment of FIG. 6, so that the voltage change of the anode (Anode) due to the repair line RPL may be decreased. Therefore, in order to reduce or minimize the voltage change of the anode (Anode) due to the parasitic capacitance, the embodiment of FIG. 7 may be used. However, even in the embodiment of FIG. 6, the repair line RPL, the connecting portion CP, and the anode (Anode) are connected through two parasitic capacitances, so that they are connected with a sufficiently small parasitic capacitance, and there may be fewer issues with display quality.

Hereinafter, a planar structure of a comparative example, and a display defect that may occur in the comparative example, will be described in more detail with reference to FIG. 8 and FIG. 9.

Figure 8:
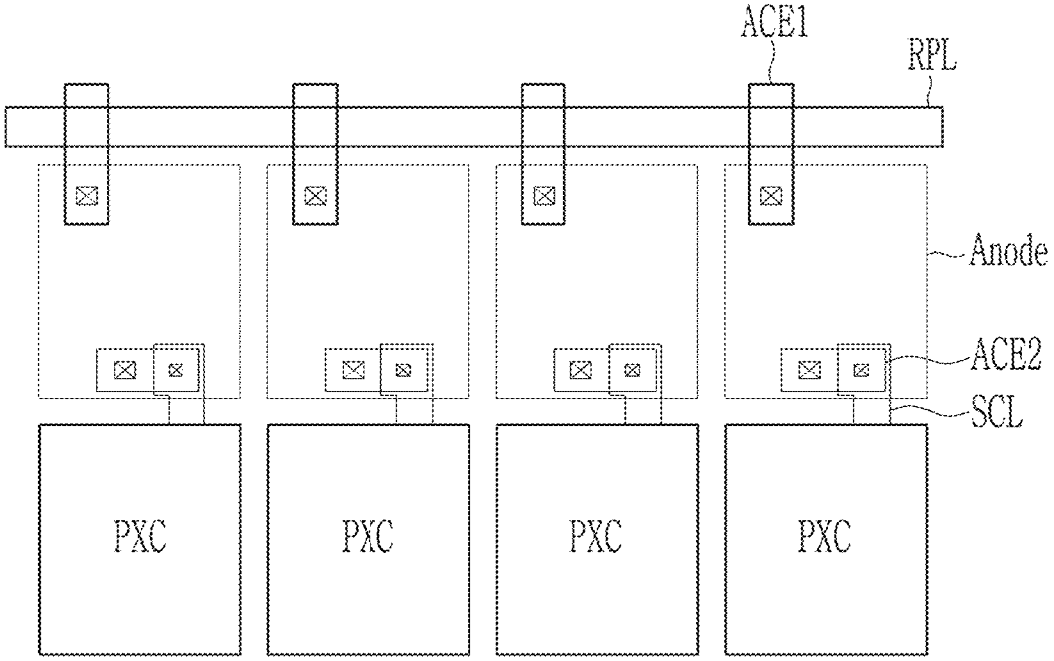
FIG. 8 illustrates a top plan view of a portion of a light emitting panel according to a comparative example.

FIG. 8 illustrates a top plan view of a portion of a light emitting panel according to a comparative example, and FIG. 9 illustrates a display defect of a light emitting panel according to a comparative example.

First, according to the comparative example of FIG. 8, when compared with the embodiment of FIG. 3, the bridge BL and the connecting portion CP do not exist between the repair line RPL and the anode connecting member ACE1. In other words, the comparative example has a structure in which the anode connecting member ACE1 and the repair line RPL are connected to each other, and the anode connecting member ACE1 directly overlaps with and is connected to the anode (Anode) through an opening. As a result, the repair line RPL and the anode (Anode) may be connected to a portion in which the anode connecting member ACE1 and the repair line RPL overlap with one laser short. However, another anode (Anode) that is not directly connected to the repair line RPL is connected to the repair line RPL with one parasitic capacitance, so it is directly affected by the voltage change of the repair line RPL. Accordingly, the voltage of the source electrode of the n-type driving transistor T1 is also directly affected. Therefore, even if the voltage of the gate electrode of the driving transistor T1 is constant or substantially constant, the voltage difference between the source electrode and the gate electrode of the driving transistor T1 may be changed, so that the output current of the driving transistor T1 may also be changed. This change in the output current may occur along the first direction in which the repair line RPL extends.

In FIG. 9, in the comparative example, when only a central rectangular portion (BLACK) is indicated in black and the other portions are indicated in white, at left and right sides of the portion (BLACK) indicated in black, or in other words, at opposite sides thereof in the first direction, a problem of a display quality may occur, in which relatively low luminance is displayed while the output of the driving transistor T1 is changed by coupling of the repair line RPL and the anode (Anode).

However, according to one or more embodiments of the present disclosure as shown in FIG. 1 to FIG. 7, the repair line RPL and the anode (Anode) are connected through two parasitic capacitances so that interference with each other is reduced, and deterioration of the display quality may not occur as shown in FIG. 9.

Hereinafter, a modified embodiment from that of FIG. 1 and FIG. 4 will be described with reference to FIG. 10 and FIG. 11.

Figure 10:
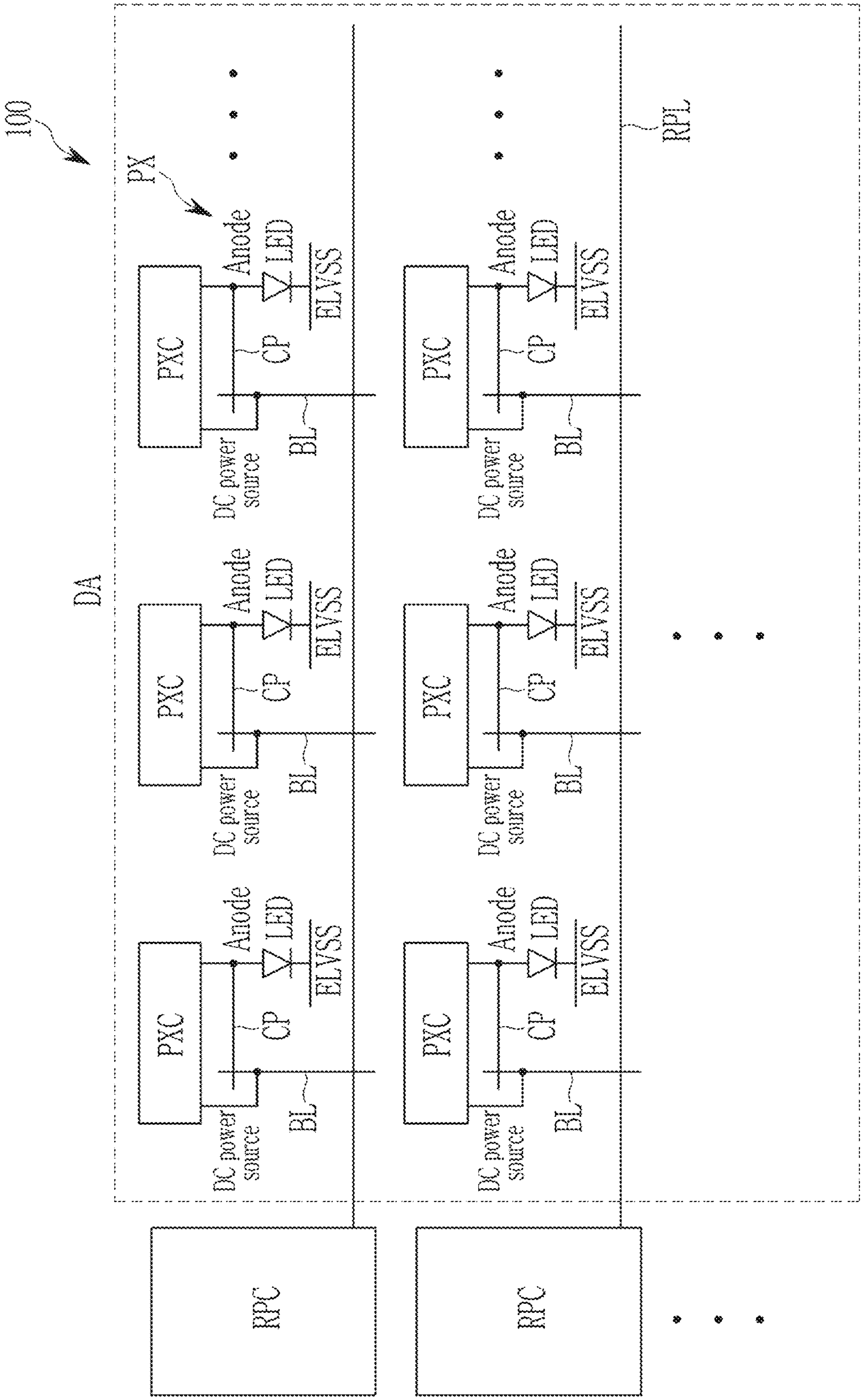
FIG. 10 illustrates a schematic circuit diagram of a light emitting panel according to another embodiment.
Figure 11:
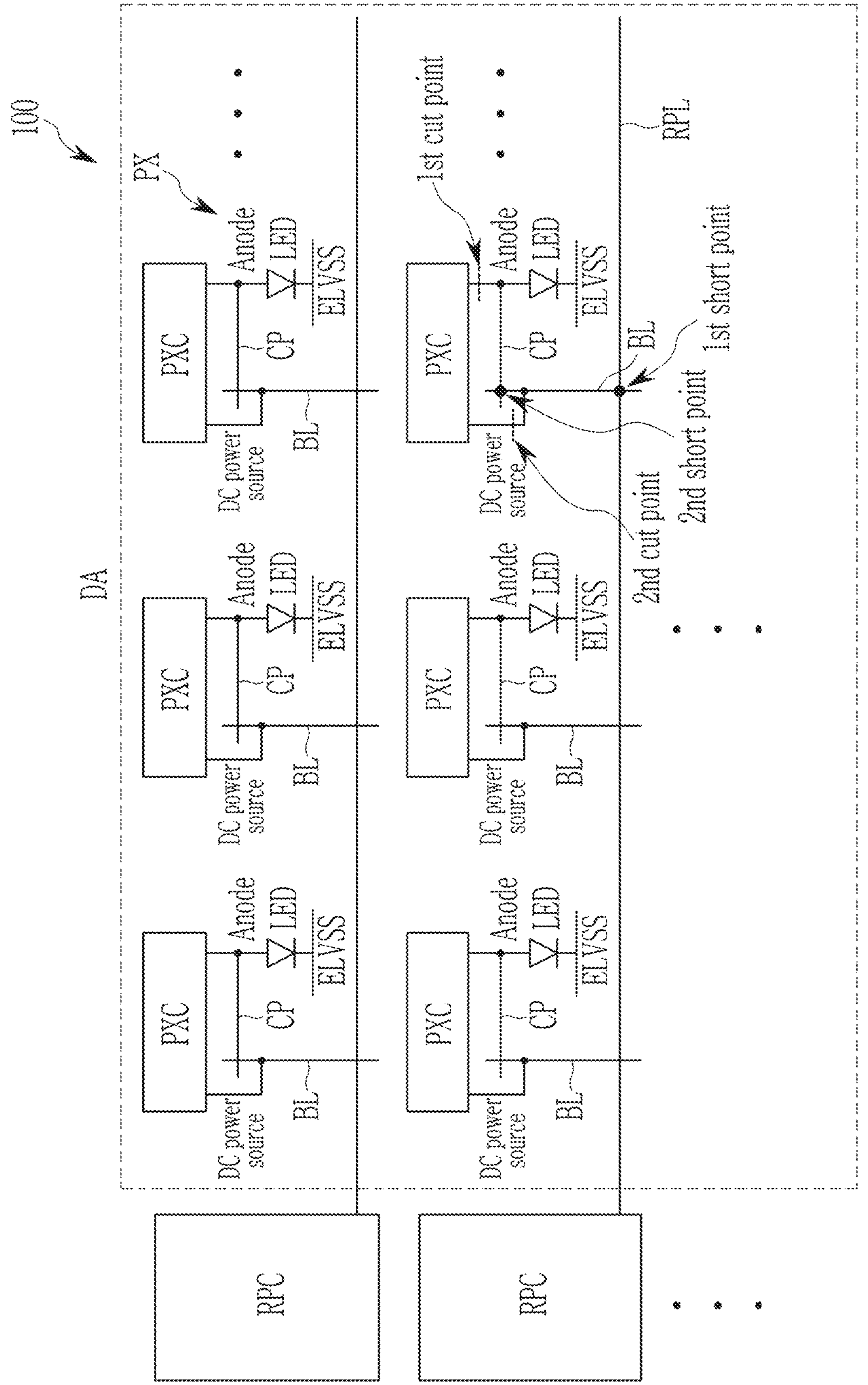
FIG. 11 illustrates a repair position of the light emitting panel according to the embodiment of FIG. 10.

FIG. 10 illustrates a schematic circuit diagram of a light emitting panel according to another embodiment, and FIG. 11 illustrates a repair position of the light emitting panel according to the embodiment of FIG. 10.

First, referring to FIG. 10, compared with the embodiment of FIG. 1, the bridge BL is not floating, and a voltage (e.g., a DC power source) having a constant or substantially constant voltage value is transmitted. Here, the DC power source may be a voltage used in the pixel circuit PXC, and may be one of the driving voltage ELVDD or the driving low voltage ELVSS. In addition, when the pixel circuit PXC receives various different voltages, such as an initializing voltage, one of the corresponding different voltages may be provided to the bridge BL.

Compared with the embodiment in which the bridge BL is floating, when the bridge BL has the constant or substantially constant voltage (e.g., the DC power source), the bridge BL may shield the repair line RPL, so it may be prevented or substantially prevented from being coupled to the connecting portion CP and the anode (Anode). As a result, the repair line RPL may have less influence on the connecting portion CP, the anode (Anode), and the source electrode of the driving transistor T1, thereby preventing or substantially preventing deterioration of display quality.

The embodiment shown in FIG. 10 further includes an additional cut position (e.g., a 2nd cut point) for additional cutting during a repair process as shown in FIG. 11.

In FIG. 11, a pixel positioned at a lower right side of the six pixels illustrated is referred to as a defective pixel, and a repair position thereof is illustrated.

Referring to FIG. 11, at opposite ends of the bridge BL, the positions (e.g., the 1st short point and the 2nd short point) for shorting with a laser or the like are positioned, respectively, and the bridge BL is connected to the repair line RPL through the first short point (1st short point), and is connected to the anode (Anode) via the connecting portion CP through the second short point (2nd short point). The cut position (e.g., the 1st cut point, hereinafter, also referred to as a first cut position) for electrically separating the anode (Anode) and the pixel circuit PXC from each other during repair is included, and the cut position (e.g., the 2nd cut point, hereinafter, also referred to as a second cut position) for electrically separating the DC power source when cut to prevent or substantially prevent the voltage (e.g., the DC power source) having a constant or substantially constant voltage value from being transmitted to the bridge BL is also shown.

Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. A light emitting display device comprising:

a light emitting diode at a display area, and including an anode and a cathode;

a pixel circuit at the display area, and configured to transmit an output current to the anode of the light emitting diode;

a repair line extending in a first direction;

a repair pixel circuit connected to the repair line;

a bridge including one end overlapping with the repair line; and a connecting portion connected to the anode, and including one end overlapping with the bridge, wherein the bridge is not connected to the repair line, the connecting portion, and the anode.

2. The light emitting display device of claim 1, wherein the bridge has a first parasitic capacitance with the repair line, and a second parasitic capacitance with the connecting portion.

3. The light emitting display device of claim 2, wherein:

a first short position is located at a portion in which the one end of the bridge and the repair line overlap with each other;

a second short position is located at a portion in which the one end of the connecting portion and the bridge overlap with each other; and a first cut position is located at a portion in which the output current of the pixel circuit is transmitted to the anode.

4. The light emitting display device of claim 3, wherein the first cut position is not located at the bridge and the connecting portion.

5. The light emitting display device of claim 3, wherein the bridge is electrically floating.

6. The light emitting display device of claim 3, wherein a first voltage is configured to be transmitted to the bridge, the first voltage being one of a plurality of voltages that are applied to the pixel circuit, and has a constant voltage value.

7. The light emitting display device of claim 6, wherein the first voltage is one of a driving voltage applied to the pixel circuit, a driving low voltage transmitted to the cathode, or an initializing voltage that initializes the pixel circuit.

8. The light emitting display device of claim 7, wherein a second cut position is located at a portion configured to transmit the first voltage to the bridge, and when the second cut position is cut, the first voltage is not transmitted to the bridge.

9. The light emitting display device of claim 2, wherein:

the pixel circuit comprises a driving transistor configured to generate the output current; and the driving transistor is an n-type transistor.

10. The light emitting display device of claim 9, wherein the pixel circuit further comprises:

a second transistor connected to a data line configured to transmit a data voltage; and a storage capacitor connected to a gate electrode of the driving transistor.

11. The light emitting display device of claim 10, wherein the repair pixel circuit comprises a driving transistor that is an n-type transistor, a second transistor configured to receive a data voltage, and a storage capacitor connected to the gate electrode of the driving transistor of the repair pixel circuit.

12. The light emitting display device of claim 11, wherein the repair pixel circuit is located at a non-display area around the display area.

13. A light emitting display device comprising:

a pixel circuit configured to generate an output current, and comprising an output terminal configured to output the output current;

an anode configured to receive the output current from the output terminal of the pixel circuit;

a repair line extending in a first direction;

a connecting portion connected to the anode; and a bridge having one end overlapping with the repair line in a plan view, and another end overlapping with the connecting portion in a plan view, wherein the bridge is located at a first conductive layer, and the repair line and the connecting portion are located at a different conductive layer from the first conductive layer.

14. The light emitting display device of claim 13, wherein:

the connecting portion and the repair line are located at the same conductive layer as each other; and the bridge is located at the first conductive layer above the conductive layer of the connecting portion and the repair line.

15. The light emitting display device of claim 13, wherein:

the connecting portion is located at a second conductive layer different from the first conductive layer;

the repair line is located at a third conductive layer different from the first conductive layer and the second conductive layer; and the bridge is located at the first conductive layer above the second conductive layer and the third conductive layer of the connecting portion and the repair line.

16. The light emitting display device of claim 13, further comprising a first anode connecting member connecting the anode and the connecting portion to each other, wherein one end of the first anode connecting member is connected to the connecting portion through an opening, and another end of the first anode connecting member is connected to the anode through an opening.

17. The light emitting display device of claim 13, further comprising a second anode connecting member connecting the output terminal of the pixel circuit and the anode to each other, wherein one end of the second anode connecting member is connected to the output terminal through an opening, and another end of the second anode connecting member is connected to the anode through an opening.

18. The light emitting display device of claim 17, wherein:

a first short position is located at a portion in which the one end of the bridge and the repair line overlap with each other;

a second short position is located at a portion in which the other end of the bridge and the connecting portion overlap with each other; and a first cut position is located at the output terminal of the pixel circuit.

19. The light emitting display device of claim 13, wherein the bridge is electrically floating.

20. The light emitting display device of claim 13, wherein the pixel circuit comprises:

a driving transistor configured to generate the output current;

a second transistor connected to a data line configured to transmit a data voltage; and a storage capacitor connected to a gate electrode of the driving transistor, and wherein the driving transistor is an n-type transistor.

* * * * *